United States Patent
Shieh et al.

(10) Patent No.: US 7,246,612 B2
(45) Date of Patent: Jul. 24, 2007

(54) OIL SEPARATOR

(75) Inventors: Teng-Hua Shieh, Ann Arbor, MI (US); Wei Liu, Canton, MI (US)

(73) Assignee: Toyota Technical Center USA, Inc, Ann Arbor, MI (US)

( * ) Notice: Subject to any disclaimer, the term of this patent is extended or adjusted under 35 U.S.C. 154(b) by 0 days.

(21) Appl. No.: 10/961,557

(22) Filed: Oct. 8, 2004

(65) Prior Publication Data

US 2006/0075998 A1    Apr. 13, 2006

(51) Int. Cl.
*F01M 13/02* (2006.01)
(52) U.S. Cl. ................................... 123/572
(58) Field of Classification Search ........ 123/572–574, 123/41.86
See application file for complete search history.

(56) References Cited

U.S. PATENT DOCUMENTS

| | | | | |
|---|---|---|---|---|
| 1,683,039 | A | * | 9/1928 | Jack .......................... 123/572 |
| 1,735,694 | A | * | 11/1929 | Remington ................... 55/419 |
| 3,146,768 | A | * | 9/1964 | Osborne ................ 123/568.12 |
| 3,455,284 | A | * | 7/1969 | High .......................... 123/572 |
| 3,889,649 | A | * | 6/1975 | Polaner ...................... 123/572 |
| 5,239,972 | A | * | 8/1993 | Takeyama et al. .......... 123/573 |
| 5,450,835 | A | * | 9/1995 | Wagner ...................... 123/573 |
| 6,279,556 | B1 | | 8/2001 | Busen et al. ................. 123/572 |
| 6,626,163 | B1 | | 9/2003 | Busen et al. ................. 123/572 |
| 6,725,849 | B2 | * | 4/2004 | Stegmaier et al. .......... 123/572 |

* cited by examiner

*Primary Examiner*—Marguerite McMahon
(74) *Attorney, Agent, or Firm*—Gifford, Krass, Sprinkle, Anderson & Citkowski, P.C.

(57) ABSTRACT

An oil separator is provided for removing oil from crankcase ventilation gases of an internal combustion engine. The oil separator includes a housing and a spiral shaped wall. The housing includes an inlet and an outlet. The spiral wall defines a spiral path for guiding the ventilation gases between the inlet and outlet of the housing. The spiral path has a width that decreases at a predetermined constant rate between the inlet and outlet of the housing.

8 Claims, 2 Drawing Sheets

OIL SEPARATOR

BACKGROUND OF THE INVENTION

1. Field of the Invention

The invention relates to an oil separator for an internal combustion engine. More particularly, the invention relates to an oil separator for removing oil from PCV gases of an internal combustion engine.

2. Description of the Related Art

An internal combustion engine typically includes a combustion chamber, where a fuel air mixture is burned to cause movement of a set of reciprocating pistons, and a crankcase, which contains the crankshaft driven by the pistons. During operation, it is normal for the engine to experience "blowby," wherein combustion gases leak past the pistons from the combustion chamber and into the crankshaft. These combustion or blowby gases contain moisture, acids and other undesired by-products of the combustion process.

An engine typically includes a Positive Crankcase Ventilation (PCV) system for removing harmful gases from the engine and prevents those gases from being expelled into the atmosphere. The PCV system does this by using manifold vacuum to draw vapors from the crankcase into the intake manifold. Vapor is then carried with the fuel/air mixture into an intake manifold of the combustion chambers where it is burned. Generally, the flow or circulation within the system is controlled by the PCV valve, which acts as both a crankcase ventilation system and as a pollution control device.

It is normal for blowby gases to also include a very fine oil mist. The oil mist is carried by the PCV system to the manifold. The oil mist is then burned in the combustion chamber along with the fuel/air mixture. This results in an increase in oil consumption. A known method of removing oil from the blowby gases is to use a labyrinth or cyclone-type separator design. A path is provided through which small oil droplets pass and coalesces into larger droplets. The droplets are then re-introduced back to a sump, which generally holds excess oil in the system. Conventional cyclone separators, however, have a fixed radius and convergent nozzle and, as a result, require a high velocity to generate a sufficient centrifugal force to promote a formation of oil film from smaller droplets. Conventional cyclone separators are also known to generate a high pressure loss. Examples of cyclone separators are disclosed in U.S. Pat. Nos. 6,279,556 B1 and 6,626,163 B1 to Busen et al., both of which are assigned Walter Hengst GmbH & Co. KG.

Thus, it remains desirable to provide a cyclone oil separator that provides improved oil separation performance, lower pressure loss and greater system flexibility over conventional cyclone designs.

SUMMARY OF THE INVENTION

According to one aspect of the invention, an oil separator is provided for removing oil from crankcase ventilation gases of an internal combustion engine. The oil separator includes a housing having an inlet and an outlet. The oil separator also includes a wall defining a spiral path through which the gases travel between the inlet and outlet of the housing. The spiral path having a width that decreases in size between the inlet and the outlet.

According to another aspect of the invention, the width of the spiral path decreases at a predetermined constant rate between the inlet and the outlet.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
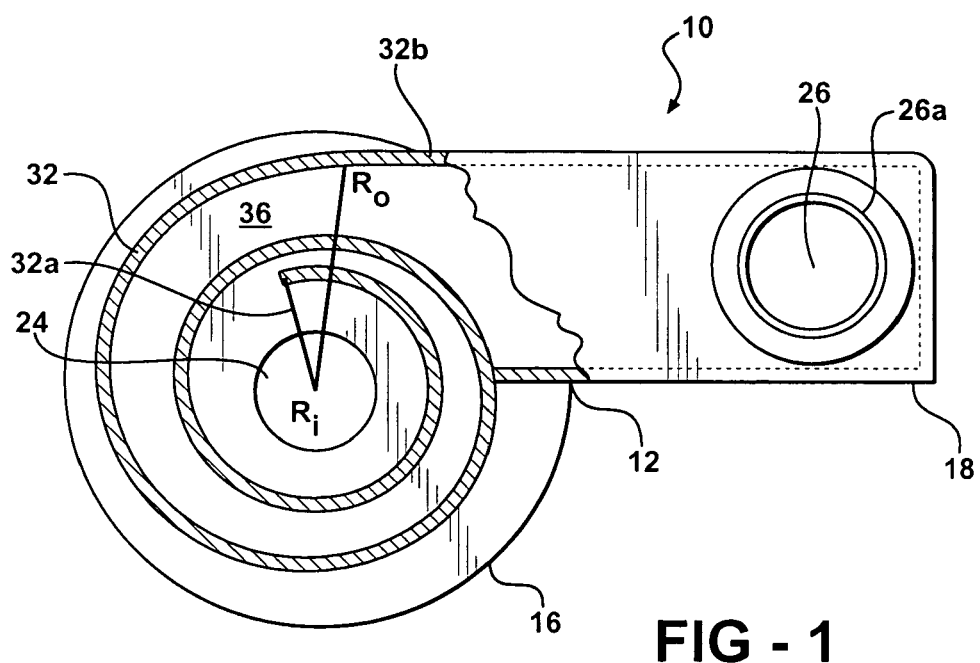
FIG. 1 is top elevational view of an oil separator according to the invention.
Figure 2:
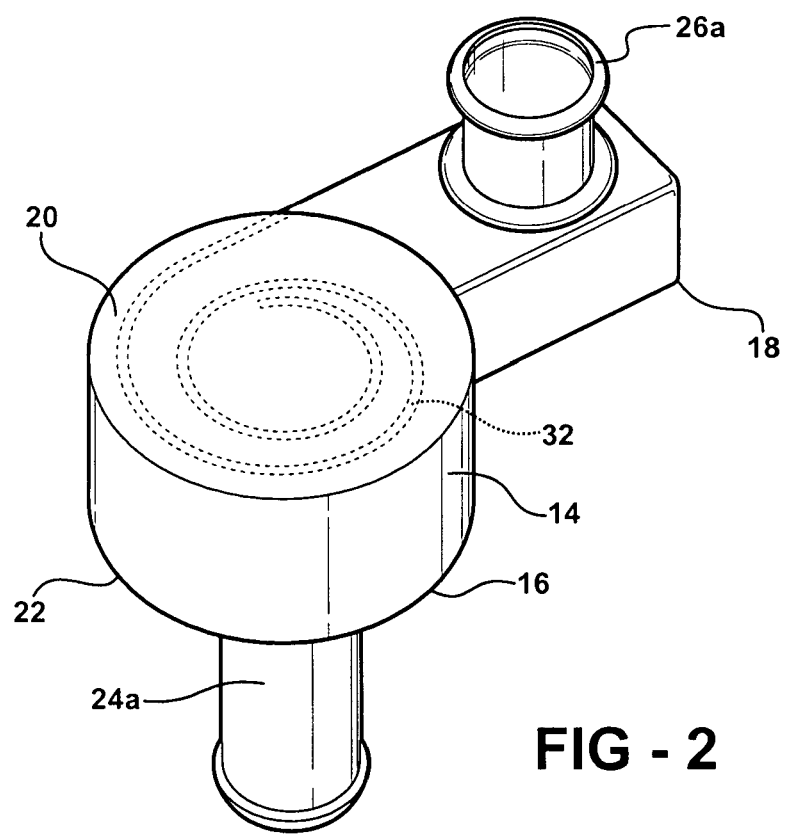
FIG. 2 is a perspective view of the oil separator of FIG. 1.

Referring to FIGS. 1 and 2, an oil separator for removing oil from crankcase ventilation gases of an internal combustion engine is generally indicated at 10. The oil separator includes a housing 12. The housing 12 includes a side wall 14 extending between a top end 20 and an opposite bottom end 22 of the housing 12. The side wall 14 also defines a cylindrical portion 16 and a leg portion 18. The leg portion 18 extends outwardly from a periphery of the cylindrical portion 16. A housing outlet 24 is defined in the bottom end 22 of the cylindrical portion 16. An outlet nozzle 24a extends outwardly from the housing 12 and is in fluid communication with the housing outlet 24. A housing inlet 26 is formed in the leg portion 16. An inlet nozzle 26a extends outwardly from the housing 12 and is in fluid communication with the housing inlet 26.

The oil separator 10 also includes a spiral wall 32 having a plurality of coils. The spiral wall 32 is disposed in the cylindrical portion 16 of the housing 12. The spiral wall 32 has an inner end 32a and an opposite outer end 32b. The inner end 32a of the spiral wall 32 is radially spaced apart from an adjacent coil of the spiral wall 32 to define a path exit. Similarly, the outer end 32b is radially spaced apart from an adjacent coil of the spiral wall 32 to define a path inlet. The spiral wall 32 defines a continuous spiral path 36 extending between the path inlet and the path outlet. Preferably, the path 36 decreases in width between the path inlet and the path outlet. Most preferably, the path 36 decreases in width at a predetermined constant rate between the path inlet and the path outlet. In one embodiment, the coils of the spiral wall 32 are defined in accordance with the formulas:

$$r = R_o(1 - \sin(90t)) + R_i$$

$$\Theta = 360(n)(t)$$

$$0 \leq t \leq 1$$

wherein r is the distance between the spiral wall 32 and a center point P, $R_i$ is the predetermined radial distance between the inner end 32a and the center point, $R_o$ is the predetermined radial distance between the outer end 32b and the center point, and n is the number of revolutions or coils of the spiral wall 32.

The housing 12 and the spiral wall 32 can be formed of any suitable material known to those skilled in the art, such as plastics or metals. The housing 12 and spiral wall 32 can also be formed using any suitable processes, such as molding, casting, milling, welding or any combinations thereof.

In use, crankcase ventilation gases having oil mist enter the housing inlet 26 of the housing 12 via the outlet nozzle 24a. The gases pass through the leg portion 18 and enter the inlet of the path 36. The gases are guided along the spiral path 36 toward the housing outlet 24 by the spiral wall 32. The gases are also accelerated as the path 36 narrows toward the housing outlet 24. A resulting centrifugal force acts upon the gases and promotes formation of oil film from the oil mist. The oil film coalesces as the gases continue about the spiral path 36. The heavier oil film is now removed from the gas flow. The oil film and the substantially de-oiled gases exit the housing outlet 24 via the outlet nozzle 24a. The oil film is re-introduced to the oil sump upon exiting the housing 12. The substantially de-oiled gases are directed to the engine intake for combustion with the fuel/air mixture.

The spiral shape of the spiral wall 32 provides other benefits over conventional cyclone-type oil separators. The spiral shape of the spiral wall 32 promotes a smooth gas flow through the spiral path 36 with minimal recirculation. Smooth gas flow through the spiral path 36 allows relatively low gas velocity, which results in less pressure loss and, in general, increased efficiency compared to conventional separator designs. Increased efficiency means more oil is extracted from the crankshaft ventilation gases and not burned in the combustion cycle. Another benefit of the spiral shape of the spiral wall 32 is a more compact package compared to conventional designs.

Packaging of the spiral wall 32 within the housing 12 allows the oil separator 10 to be installed in a variety of vehicle applications. The height of the spiral wall 32, width of path inlet, width of the path outlet, rate at which the width of the spiral path decreases between the path inlet and outlet can each be independently modified in the design to meet the requirements of the vehicle application. Additionally, the inner radius of the spiral wall 32 or width of the path exit can be modified for a specific application, while maintaining the outer radius of the spiral wall 32 or width of the inlet.

Figure 3:
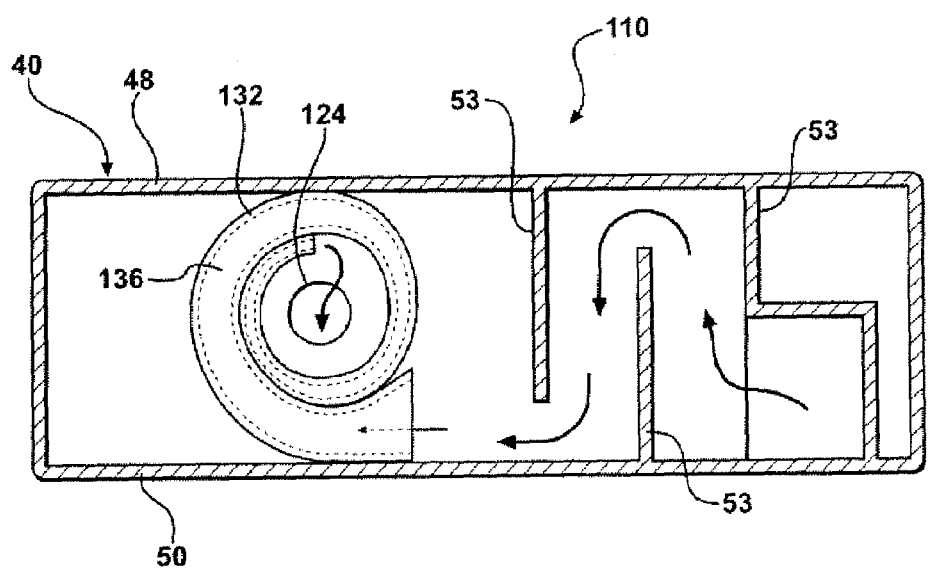
FIG. 3 is a top, elevational view of an oil separator according to a second embodiment of the invention.
Figure 4:
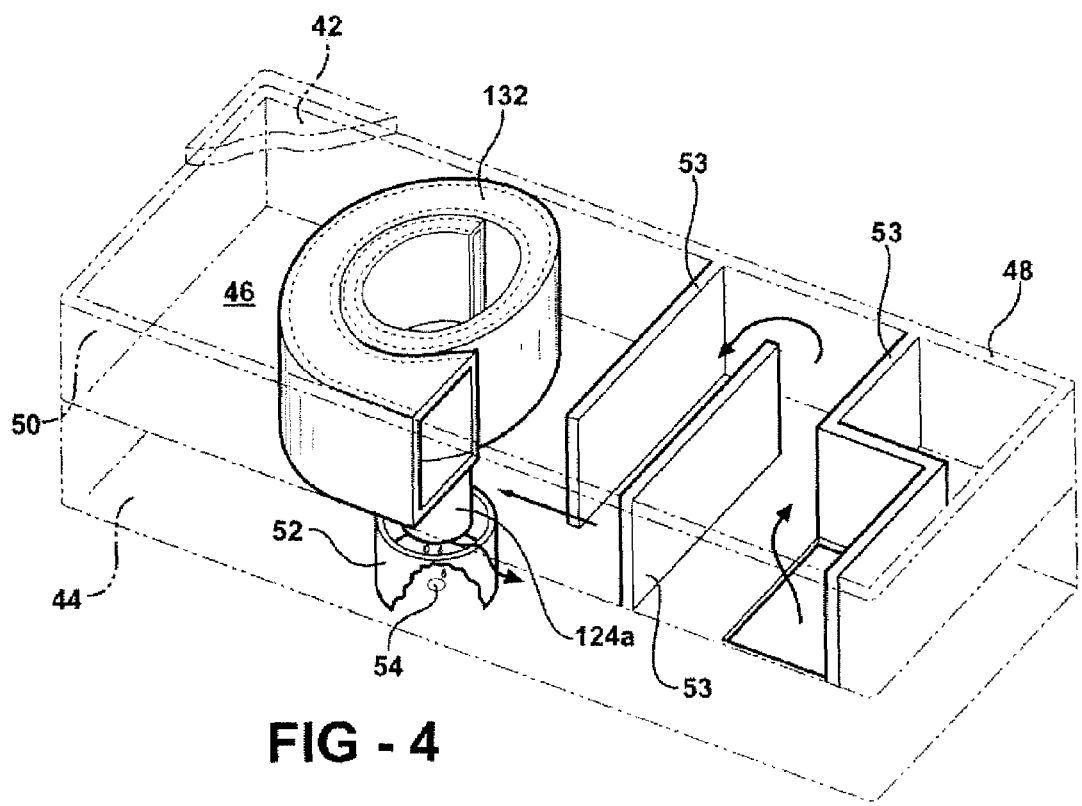
FIG. 4 is a side, perspective view of the oil separator of FIG. 3.

Referring to FIGS. 3 and 4, a second embodiment of the oil separator is generally indicated at 110, wherein like numerals indicate like parts throughout the views. In the second embodiment, the spiral path 136 is defined by a continuous spiral tube 132 rather than a wall 32 as provided in the first embodiment. As in the previous embodiment, the spiral path 136 has a width that decreases at a predetermined constant rate between the inlet and the outlet. Also, the tube 132 is enclosed in a baffle housing 40 of the engine rather than a dedicated housing 12 as provided in the first embodiment above. The baffle housing 40 includes a top plate 42, a bottom plate 44 and a middle plate 46 disposed therebetween. The baffle housing 40 also includes spaced apart side walls 48, 50 defining a passage for directing gases from the crankcase toward the spiral tube 132.

The outlet 124 for the substantially de-oiled gases is formed in the middle plate 46. The spiral tube 132 is disposed between the top 42 and middle 46 plates. The spiral tube 132 is also generally axially aligned with the housing outlet 124. The nozzle 124a, aligned with the housing outlet 124, protrudes axially from the middle plate 46 toward the bottom plate 44. A cup member 52 having generally cylindrical walls is fixedly secured to the bottom plate 44 and axially aligned with the housing outlet 124 and nozzle 124a. A distal end of the nozzle 124a extends into an open end of the cup member 52. An aperture 54 is formed at a bottom of the cup member 52. The aperture 54 is aligned with a corresponding aperture in the bottom plate 44 of the baffle housing 40. Alternatively, a cylindrical wall can be fixedly secured to the bottom plate 44 and generally aligned with the aperture in the bottom plate 44.

A plurality of baffle plates 53 each extends between the top 42 and bottom 44 plates. Adjacent baffle plates 53 are spaced apart and positioned endwise against opposite side walls 48, 50 to define a labyrinth-type passage. Crankcase gases flow through the passage 54 as indicated by the arrows shown in FIG. 3.

In use, the gases from the crankcase are guided through the labyrinth-type passage by the baffle plates 53 to the inlet of the spiral path 136. The gases are accelerated along the spiral path 136 by the spiral tube 132 due to the narrowing width of the spiral tube 132. The resulting centrifugal force exerted on the gases promotes formation of oil film from oil mist. The heavier oil film falls out of the gas flow. The oil film and substantially de-oiled gas flow exit the spiral path 136 through the nozzle 124a. The substantially de-oiled gases exit through the nozzle 124a and are forced into the cup member 52. The gases are diverted outwardly and upwardly, as viewed in FIG. 4, by the bottom and sides of the cup member 52. Preferably, the distal end of the nozzle 124a is sufficiently close to the bottom of the cup member 52 to create an impact or local high pressure region which further promotes the formation of oil film any oil mist or droplets still remaining in the substantially de-oiled gas flow. The oil film coalesces and exits the housing 40 through the aperture 54 in the cup member and bottom plate 44. The oil is re-routed by conventional means to the sump.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. An oil separator for removing oil from crankcase ventilation gases of an internal combustion engine, the oil separator comprising:
    a housing having an inlet and an outlet, the housing having a top plate, a bottom plate and a middle plate disposed therebetween;
    a wall defining a spiral path between the inlet and outlet of the housing, the spiral path having a width that decreases at a predetermined constant rate between the inlet and the outlet, the wall being supported in a generally upright manner between the top plate and the bottom plate of the housing; and
    a cup member operative between the wall and the housing for directing oil from the spiral path through the outlet of the housing.

2. An oil separator as set forth in claim 1, wherein the cup member includes generally upright walls disposed about the outlet of the housing.

3. An oil separator as set forth in claim 1, wherein the outlet of the housing is formed in the bottom plate.

4. An cit separator as set forth in claim 3, wherein the cup member includes generally cylindrical walls extending upwardly from the bottom plate for directing oil from the spiral path through the outlet of the housing.

5. An oil separator as set forth in claim 4, wherein the middle plate includes an aperture formed therein for directing the gases and oil from the spiral path toward the cup member.

6. An oil separator as set forth in claim 5 including a nozzle for guiding the gases and oil between the aperture in the middle plate and the cup member on the bottom plate.

7. An oil separator as set forth in claim 6, wherein the nozzle includes a distal end that extends into the cup member.

8. An oil separator as set forth in claim 1, wherein the housing includes at least one baffle wall forming a labyrinth-type passageway through which the gases pass between the inlet of the housing and the spiral path.

* * * * *